Figure 1:
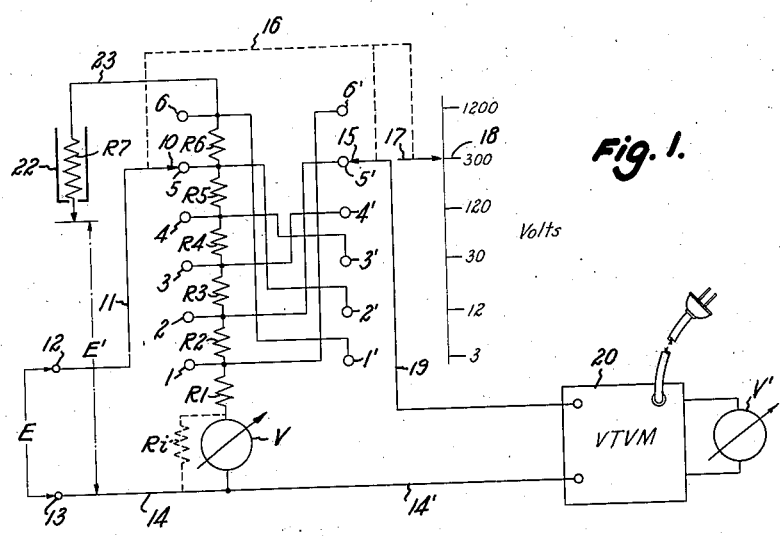

Aug. 16, 1949.  R. W. GILBERT  2,478,966

DUAL PURPOSE VOLTMETER RANGE ATTENUATOR

Filed March 29, 1948

Inventor:
Roswell W. Gilbert,
By Pierce, Scheffler + Parker
Attorneys.

Patented Aug. 16, 1949

2,478,966

UNITED STATES PATENT OFFICE 2,478,966

DUAL PURPOSE VOLTMETER RANGE ATTENUATOR

Roswell W. Gilbert, Montclair, N. J., assignor to Weston Electrical Instrument Corporation, Newark, N. J., a corporation of New Jersey Application March 29, 1948, Serial No. 17,628

4 Claims. (Cl. 171—95)

This invention relates to voltmeter range attenuators of resistance networks adjustable to alter the measuring range of voltmeters, and more particularly to a dual purpose range attenuator for use with a vacuum tube voltmeter which is also operable as a direct indicating voltmeter.

In high input impedance vacuum tube voltmeters, it is customary to use a shunt voltage divider as a range attenuator. In this class of equipment, the highest feasible input impedance is usually determined by the upper limit of resistance to which accurate resistors can be manufactured, and the shunt type of divider presents the entire sum of all resistors as the input impedance. The lowest measuring range is obtained when the entire voltage drop across the divider is impressed upon the vacuum tube amplifier system, and higher measuring ranges are obtained by adjustment of a tap switch to impress only a selected fraction of the full voltage drop upon the vacuum tube amplifier system. The shunt type of voltage divider is thus the most effective type of input network where high input impedance on all measuring ranges is a primary object.

However, in portable vacuum tube voltmeters it is also desirable to arrange the circuit to be usable as a standard direct indicating voltmeter when service power for operation of the instrument amplifier is not available. Unfortunately the shunt type of divider is not usable when the indicating instrument requires current for its operation, and a second divider of the series type is customarily necessary where this type of dual operation is desired. In conventional practice the shunt and the series dividers would be physically separate devices, and the dual operation feature would require two entirely separate sets of range resistors.

Objects of the present invention are to simplify the construction of the range attenuators of dual purpose voltmeters by employing a single set of resistors for both the shunt and the series voltage dividers. An object is to provide a dual purpose range attenuator including a plurality of serially connected resistors, two sets of switch contacts connected to the terminals of the several resistors, the connections of the sets of contacts being reversely arranged, and switch blades ganged for simultaneous adjustment with respect to the sets of switch contacts, one switch blade being connected to an input terminal and the other switch blade being connected to the input to the vacuum tube voltmeter. A further object is to provide a dual purpose range attenuator as above described in which the resistors have such relative values that each adjustment of the range-change switches conditions the apparatus for the same range of voltage measurements by the vacuum tube voltmeter and the direct indicating voltmeter.

Figure 2:
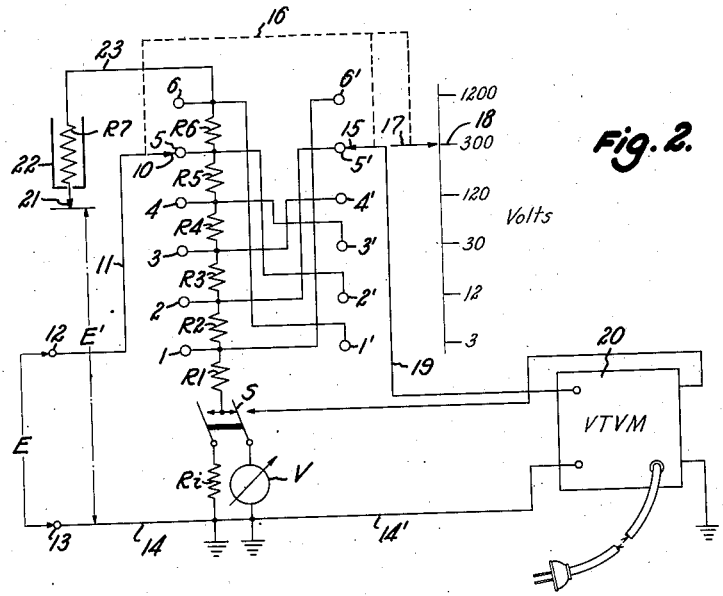

These and other objects and the advantages of the invention will be apparent from the following specification when taken with the accompanying drawings in which:

Fig. 1 is a circuit diagram of a dual purpose voltage range attenuator and voltmeter assembly embodying the invention; and Fig. 2 is a circuit diagram of another embodiment in which a single meter is employed for direct voltage measurements and vacuum tube voltmeter measurements.

In the Fig. 1 diagram, the reference characters R1 to R6 identify a plurality of resistors connected in series with each other and with a meter V which has an internal resistance Ri, as indicated in broken line in shunt across the schematically shown instrument V. A series of taps or switch contacts 1–6 are connected to the outer terminals of resistors R1 to R6 respectively, and a cooperating switch blade 10 which is adjustable along the contacts 1–6 is connected by a lead 11 to an input terminal 12. The other input terminal 13 is connected by a lead 14 to the terminal of meter V opposite that to which the resistor R1 is connected. Input voltages E which are applied to input terminals 12, 13 may be measured in different ranges according to the relative values of the several resistors and the adjustment of the switch blade 10 with respect to the taps or contacts 1–6. The lowest measuring range is obtained when the switch blade 10 engages the contact 1 to include only the resistor R1 in series with the meter V, and progressively higher measuring ranges are obtained by shifting the switch blade 10 to include additional resistors in series with the meter.

A second set of switch contacts 1'–6' is connected to the outer terminals of the resistors R1 to R6, and these contacts are reversely connected to the resistor terminals, i. e., contact 1' is connected to the outer terminal of resistor 6, contact 2' is connected to the junction of resistors R5 and R6, and so forth, the contact 6' being connected to the junction of resistors R1 and R2. The switch blade 15 which is adjustable along contacts 1'–6' is ganged to the switch blade 10, as indicated by broken line 16, and to an index mark 17 which is displaced with respect to a graduated scale 18 of voltage ranges. The switch blade 15 is connected by lead 19 to the high voltage input terminal of a vacuum tube voltmeter 20; the other input terminal being connected by leads 14' and 14 to the common input terminal of the dual purpose voltage measuring apparatus.

The second input terminal of the vacuum tube voltmeter is a probe point 21 at the tip of an insulating handle or sleeve 22, the probe point 21 being connected through a conventional isolation resistor R7 and lead 23 to the outer terminal of the resistor R6. The voltage E' between probe point 21 and the common terminal 13 is indicated on a meter V' which preferably is identical with the meter V.

It will be apparent that a common graduated scale of measuring ranges for direct voltage measurements and vacuum tube voltage measurements is possible only when the values of the several resistors R1 to R7 are related in the novel manner contemplated by the invention. For a common scale of voltage ranges it is essential that the range complements form a symmetrical progression, i. e. that the ratios between adjacent ranges are the same progressing downward from the highest range and upward, from the lowest range. As indicated by the values appearing on the range scale 18, the voltage ranges are:

$$3-12-30-120-300-1200$$

Other symmetrical scale ranges are possible, for example:

$$2-4-8-16-32-64-128$$
$$1-3-6-12-36, \text{ or}$$
$$2-4-10-25-50$$

For a voltmeter of 10,000 ohms per volt and the indicated voltage ranges, the values for the several resistors are:

$$R1+Ri=30,000 \text{ ohms}$$
$$R2=90,000 \text{ ohms}$$
$$R3=180,000 \text{ ohms}$$
$$R4=900,000 \text{ ohms}$$
$$R5=1.8 \text{ megohms}$$
$$R6=9.0 \text{ megohms}$$
$$R7=3.0 \text{ megohms}$$

The total input impedance of the vacuum tube voltmeter for these resistor values is 15 megohms.

The dual purpose measuring apparatus may be further simplified by providing a switch S, as shown in Fig. 2, for connecting a meter V in series with the resistors R1 to R6 for direct voltage measurements or, alternatively, connecting the meter V in the output circuit of the vacuum tube voltmeter 20 and grounding the resistor R1 through a resistor Ri of the same value as the internal resistance of the meter V.

It is to be understood that the invention is not limited to the particular values herein specified for a typical embodiment as other values and relationships which may occur to those familiar with the design and construction of voltage measuring devices fall within the spirit and scope of the invention as set forth in the following claims.

I claim:

1. A dual purpose voltmeter comprising a plurality of serially connected resistors, two sets of switch contacts reversely connected to the junctions of said resistors, switch blades ganged for simultaneous adjustment with respect to the sets of switch contacts, a meter connected between one end of the serially connected resistors and a common input terminal, a second input terminal connected to one of the switch blades, an alternative second input terminal connected to the other end of the serially connected resistors, and a vacuum tube voltmeter connected between the common input terminal and the other switch blade.

2. A dual purpose voltmeter as recited in claim 1, wherein the values of said serially connected resistors are so related that the measuring ranges of the voltmeter as established by adjustment of the switch blades form a symmetrical progression.

3. A dual purpose voltmeter as recited in claim 2, in combination with a single graduated scale of voltage measuring ranges, and an index mark ganged to said switch blades and movable along said graduated scale.

4. A dual purpose voltmeter as recited in claim 1, in combination with switch means for connecting said meter in series with said resistors or, alternatively, in the output circuit of said vacuum tube voltmeter.

ROSWELL W. GILBERT.

REFERENCES CITED

The following references are of record in the file of this patent:

FOREIGN PATENTS

| Number | Country | Date |
|---|---|---|
| 164,792 | Germany | June 28, 1904 |